UNITED STATES PATENT OFFICE.

CHARLES F. BOND, OF CHICAGO, ILLINOIS, ASSIGNOR TO WILLIAM BANNERMAN, OF SAME PLACE.

DISINFECTANT.

SPECIFICATION forming part of Letters Patent No. 408,454, dated August 6, 1889.

Application filed May 16, 1889. Serial No. 311,061. (No specimens.)

*To all whom it may concern:*

Be it known that I, CHARLES F. BOND, of Chicago, in the county of Cook and State of Illinois, have invented a new and useful Improvement in Compounds for Disinfecting and Deodorizing Purposes, of which the following is a full, clear, and exact description.

This invention consists in a compound for disinfecting and deodorizing purposes generally, including the prevention and arresting purposes generally, including the prevention and arresting the spread of yellow-fever and other contagious diseases, the same being composed of the hereinafter-named ingredients, combined in or about the following proportions: slaked lime, one barrel; red ocher, one gallon; carbolic acid, of about twenty-five per cent. strength, two and one-half gallons; crude creosote, one-half pint; bichloride of mercury, one-fourth pound; salicylic acid, one-fourth pound; sulphate of iron, three pounds; water, sixteen gallons.

The above-named ingredients, excepting the water, should first be thoroughly mixed, and then the water sprinkled onto the mass and mixed, while sprinkling, with the other ingredients.

This compound, among the several purposes or uses to which it is applicable, will, as above stated, be found an efficient disinfectant and deodorizer for the prevention and to arrest the spread of yellow-fever and other like or contagious diseases. It will almost instantly deodorize any putrid substances, and will destroy all insect life and microscopic germs in different putrid substances and dead bodies of animals. It also can be used by undertakers and others for disinfecting purposes, and will render dead bodies inodorous; likewise, can be scattered about cesspools, in alleys, and cities, villages, and other places wherever it may be necessary to prevent the spread of disease.

I am aware that some of the ingredients herein named have before been used for disinfecting and deodorizing purposes, but not in like proportions nor yet combined with the other ingredients specified; and while these proportions may to some extent be varied I find that the several ingredients, as combined and in or about the proportions named, make a very superior disinfectant and deodorizer.

Having thus described my invention, what I claim as new, and desire to secure by Letters Patent, is—

The within-described compound to be used for disinfecting and deodorizing purposes, the same consisting of slaked lime, red ocher, carbolic acid, creosote, bichloride of mercury, salicylic acid, sulphate of iron, and water, substantially in or about the proportions specified.

CHARLES F. BOND.

Witnesses:
GEORGE S. POWELL,
FLORA L. BROWN.